United States Patent
Yamaguchi et al.

(10) Patent No.: US 12,313,849 B2
(45) Date of Patent: May 27, 2025

(54) VIRTUAL IMAGE DISPLAY DEVICE AND OPTICAL UNIT

(71) Applicant: SEIKO EPSON CORPORATION, Tokyo (JP)

(72) Inventors: Tokito Yamaguchi, Azumino (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 882 days.

(21) Appl. No.: 17/512,692

(22) Filed: Oct. 28, 2021

(65) Prior Publication Data
US 2022/0137412 A1 May 5, 2022

(30) Foreign Application Priority Data
Oct. 29, 2020 (JP) .................. 2020-181053

(51) Int. Cl.
*G02B 27/01* (2006.01)
*G02B 27/09* (2006.01)

(52) U.S. Cl.
CPC ..... *G02B 27/0172* (2013.01); *G02B 27/0983* (2013.01); *G02B 2027/013* (2013.01); *G02B 2027/0178* (2013.01)

(58) Field of Classification Search
CPC ............ G02B 27/0172; G02B 27/0983; G03B 2027/0178
USPC ....................................................... 359/630
See application file for complete search history.

(56) References Cited

U.S. PATENT DOCUMENTS

| | | | |
|---|---|---|---|
| 5,687,025 A | 11/1997 | Nanba | |
| 5,714,967 A | 2/1998 | Okamura et al. | |
| 2017/0045746 A1* | 2/2017 | Ellsworth | G02B 27/0176 |
| 2022/0026722 A1* | 1/2022 | Liu | G02C 11/10 |

FOREIGN PATENT DOCUMENTS

| | | | | |
|---|---|---|---|---|
| CN | 108681068 A | * | 10/2018 | ......... G02B 27/0101 |
| JP | H09-043536 | | 2/1997 | |
| JP | 2002-303819 | | 10/2002 | |
| WO | WO-2017109856 A1 | * | 6/2017 | ........... G02B 17/004 |

OTHER PUBLICATIONS

Translation of CN108681068 (Year: 2024).*
Translation of 2017109856 (Year: 2024).*

* cited by examiner

*Primary Examiner* — Jerry L Brooks
(74) *Attorney, Agent, or Firm* — JCIPRNET (57) ABSTRACT

A virtual image display device includes a display element, a light-guiding system configured to guide imaging light that exits the display element, and a mirror member having a first surface where the imaging light that exits the light-guiding system is incident while being refracted and a second surface that reflects the imaging light that passes through the first surface and causes the imaging light to exit the mirror member through the first surface where the imaging light is refracted. In the mirror member, the curvature of the first surface differs from the curvature of the second surface.

14 Claims, 7 Drawing Sheets

VIRTUAL IMAGE DISPLAY DEVICE AND OPTICAL UNIT

The present application is based on, and claims priority from JP Application Serial Number 2020-181053, filed Oct. 29, 2020, the disclosure of which is hereby incorporated by reference herein in its entirety.

BACKGROUND

1. Technical Field

The present disclosure relates to a virtual image display device that is a head-mounted display or the like, and to an optical unit incorporated in the virtual image display device.

2. Related Art

Various types of virtual image display device in which imaging light from a display element is guided to a pupil of an observer by an optical element such as a mirror are proposed as a virtual image display device capable of forming and observing a virtual image, as in a head-mounted display.

An eyepiece optical system described in JP-A-9-43536 includes an image display device, a relay optical system intermediately forming an image of a display image by the image display device, and an eyepiece reflecting surface guiding light flux from an intermediate image to an eye point. Here, the relay optical system includes a refraction optical system and a relay reflecting surface. The relay reflecting surface and the eyepiece reflecting surface are eccentric and have an anamorphic aspheric surface.

The device according to JP-A-9-43536 corrects aberration by configuring the relay reflecting surface and the eyepiece reflecting surface as anamorphic aspheric surfaces, but when applied to a system that includes an eccentric optical system, for example, correction is incomplete and resolution performance is insufficient. Also, improving resolution performance by increasing the number of lenses is conceivable, but doing so enlarges the optical system and may be inappropriate for a device for which there is a strong demand for miniaturization, such as in a head-mounted display.

SUMMARY

A virtual image display device according to an aspect of the present disclosure includes a display element emitting an imaging light, a light-guiding system guiding the imaging light from the display element, and a mirror member including a first surface that refracts the imaging light that is incident from the light-guiding system and a second surface that reflects the imaging light passed through the first surface, wherein the first surface of the mirror member refracts the imaging light reflected by the second surface out of the mirror member, and a curvature of the first surface of the mirror member is different from a curvature of the second surface of the mirror member.

DESCRIPTION OF EXEMPLARY EMBODIMENTS

First Embodiment

Hereafter, an example of a virtual image display device and an optical unit incorporated into the virtual image display device according to a first exemplary embodiment of the present disclosure will be described with reference to the drawings.

Figure 1:
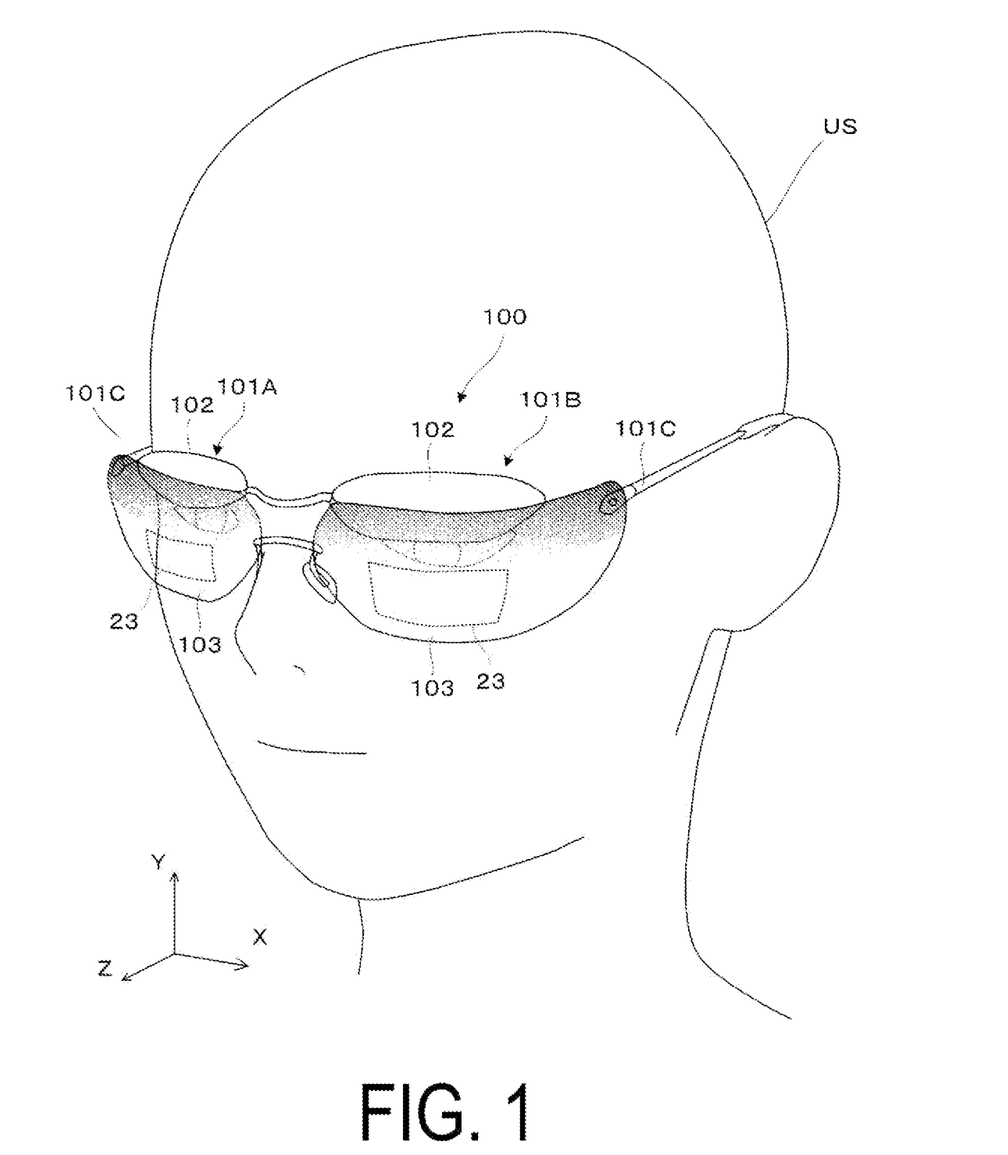
FIG. 1 is an external perspective view illustrating a virtual image display device according to a first exemplary embodiment being worn.

As illustrated in FIG. 1, a virtual image display device 100 according to the first exemplary embodiment is a head-mounted display (HMD) having the appearance of glasses, and allows an observer or user US wearing the device 100 to recognize an image that is an example of a virtual image. In FIG. 1, X, Y, and Z form an orthogonal coordinate system, a +X direction corresponds to a lateral direction in which both eyes of the user US wearing the virtual image display device 100 are aligned, a +Y direction corresponds to an upward direction orthogonal to the lateral direction in which both eyes of the user US are aligned, and a +Z direction corresponds to a forward direction of the user US or a front surface direction.

The virtual image display device 100 includes a first display device 101A forming a virtual image for a right eye, a second display device 101B forming a virtual image for a left eye, and a temple-like support apparatus 101C supporting both of the display devices 101A and 101B. The first display device 101A is configured by an optical unit 102 arranged in an upper portion of the first display device 101A and an exterior member 103 covering the entire first display device 101A in the form of a glasses lens. The second display device 101B is configured similarly, by the optical unit 102 arranged in an upper portion of the second display device 101B and the exterior member 103 covering the entire second display device 101B in the form of a glasses lens. The support apparatus 101C supports both of the display devices 101A and 101B on an upper end of the exterior member 103 using a component (not illustrated) that is disposed on the back of the exterior member 103. The second display device 101B for the left eye has a structure similar to the first display device 101A. The first display device 101A will be described below, and a description of the second display device 101B will be omitted.

Figure 2:
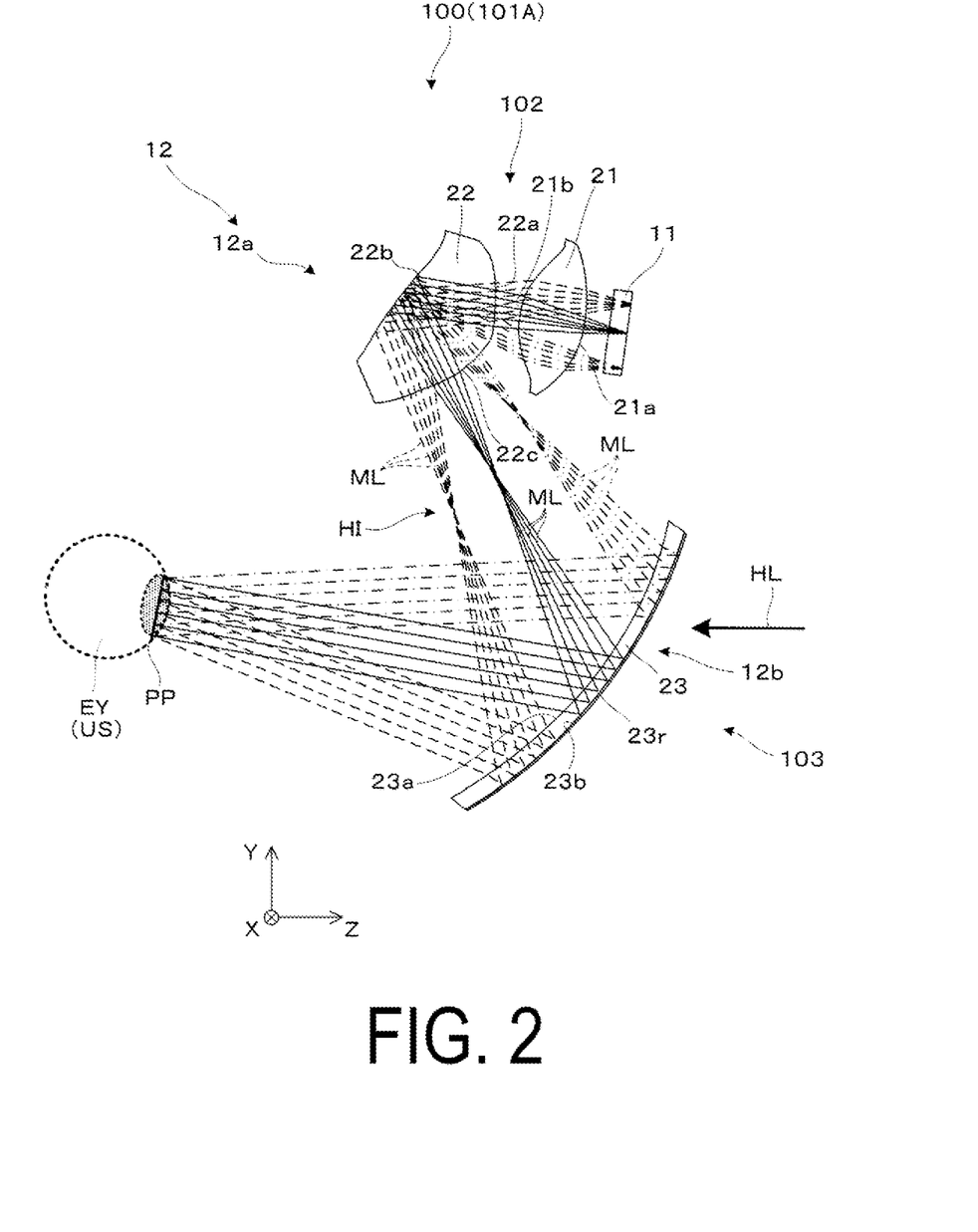
FIG. 2 is a lateral cross-sectional view illustrating an optical system of the virtual image display device of FIG. 1.

As illustrated in FIG. 2, the first display device 101A for the right eye includes, as optical elements, a display element 11 and an optical unit 12. Of these, the optical unit 12 is configured by a light-guiding system 12a and a mirror member 12b. In addition, the optical unit 12 may also be called a light-guiding device from the viewpoint of the optical unit 12 guiding imaging light ML from the display element 11 to a pupil position PP.

The display element 11 is a self-luminous display device typified by, for example, organic electroluminescence (organic EL), inorganic EL, an LED array, an organic LED, a laser array, a quantum dot emission-type element, and the like, and forms a still image or a moving image in color on a two-dimensional display surface 11*a*. The display element 11 is driven by a drive control circuit (not illustrated) and performs a display operation. When an organic EL display or display device is used as the display element 11, the display element 11 is configured to include an organic EL control unit. When a quantum dot emission-type display is used as the display element 11, the display element 11 is configured to emit green or red color by passing the light of a blue light-emitting diode (LED) through a quantum dot film. The display element 11 is not limited to a self-luminous display element, and may be configured by an LCD and another optical modulation element, and may form an image by illuminating the optical modulation element with a light source such as a backlight. As the display element 11, a liquid crystal on silicon (LCOS; LCoS is a trade name), a digital micromirror device, and the like may be used instead of the LCD.

The optical unit (light-guiding device) 12 is configured by the light-guiding system 12*a* that guides the imaging light ML that exits the display element 11, and the mirror member 12*b* that reflects the imaging light ML that exits the light-guiding system 12*a* so as to be directed toward the pupil position PP. In the example illustrated in the drawings, the optical unit 12 is configured by a projection lens 21, a prism 22, and a see-through mirror 23. Of these, the projection lens 21 and the prism 22 act as the light-guiding system 12*a*, while the see-through mirror 23 acts as the mirror member 12*b*.

In particular, in the present exemplary embodiment, the see-through mirror 23 being used as the mirror member 12*b* is configured to include a first surface 23*a* and a second surface 23*b* having mutually distinct curvatures. Also, the imaging light ML that exits the light-guiding system 12 is first incident on and refracted by the first surface 23*a*, and the imaging light ML that passes through the first surface 23*a* is reflected by the second surface 23*b*, is once again directed toward the first surface 23*a*, and exits through the first surface 23*a* while being refracted. By doing so, the number of surfaces for correcting aberration increases and optical functionality can be improved with the optical unit 12.

Hereafter, the projection lens 21, the prism 22, and the see-through mirror 23 constituting the optical unit 12 will be described in greater detail.

First, of the components configuring the light-guiding system 12*a*, the projection lens 21 is a single lens and has, as constituent optical surfaces, an incident surface 21*a* and an emitting surface 21*b*. Next, of the light-guiding system 12*a*, the prism 22 is configured to have a portion of an optically transparent prism member (main body portion) provided with a mirror vapor deposition surface. In other words, the prism 22 is a refraction/reflection optical member having a function of compounding a mirror and a lens and has, as constituent optical surfaces, an incident surface 22*a*, an inner reflection surface 22*b*, and an emitting surface 22*c*.

The projection lens 21 and the prism 22 may, for example, be asymmetrical in a vertical direction (that is, the Y direction) and be symmetrical in a lateral direction (that is, the X direction). Furthermore, each of the optical surfaces discussed above in the projection lens 21, the prism 22, and the see-through mirror 23 can be configured as a free form surface or aspheric surface, for example. Aberration reduction can be achieved by configuring each surface to be a free form surface or aspheric surface and, particularly when a free form surface is used, aberration can be easily reduced in an optical unit 12 that is an off-axis or non-coaxial optical system, discussed below.

In addition, the single lens constituting the projection lens 21 and the main body portion of the prism 22 may be made of, for example, resin, but can also be made of glass.

On the other hand, in order to act as a surface mirror, the see-through mirror 23 constituting the mirror member 12*b* is a plate-shaped optical member covering an eye EY or the pupil position PP at which a pupil is disposed and having a shape that is concave facing the pupil position PP. In addition, the see-through mirror 23 is a transmission-type reflection element that transmits a portion of light during reflection, and can superimpose external light HL on the imaging light ML to enable visual recognition, that is, enabling see-through visibility. The see-through mirror 23 described above is provided with the previously described first surface 23*a* and second surface 23*b* as optical surfaces that constitute the see-through mirror 23. Of the optical surfaces of the plate-shaped see-through mirror 23 that are disposed on an optical path of the imaging light ML, the first surface 23*a* is a −Z-side surface configuring a side that is closer to the prism 22 and the pupil position PP, that is, configuring an inner side of the concave shape, and acts as a transmission surface transmitting the imaging light ML while refracting the imaging light ML. The second surface 23*b* is a +Z-side surface configuring a side that is farther from the prism 22 and the pupil position PP, that is, configuring an outer side of the concave shape, and acts as a reflection surface reflecting the imaging light ML. In addition, through the reflection action of the second surface 23*b*, the see-through mirror 23 acts, overall, as the mirror member 12*b* reflecting the imaging light ML from the light-guiding system 12*a*. Furthermore, in order to enable see-through visibility, the see-through mirror 23 is also transmissive at the second surface 23*b* that has a reflection function.

With this in mind, in the virtual image display device 100 according to the present exemplary embodiment, the curvature of the first surface 23*a* is different from the curvature of the second surface 23*b* in the see-through mirror 23 that acts as the mirror member 12*b*. Looked at another way, although the see-through mirror 23 is plate-shaped, it is not a uniform thickness, and through the refractive action that occurs twice at the first surface 23*a*, combined with the reflective action at the second surface 23*b*, the see-through mirror 23 along with the other optical elements (the projection lens 21 and the prism 22) heightens the aberration correction function (particularly the correction function for eccentric aberration).

Note that, as with the projection lens 21 and the prism 22, the see-through mirror 23 may, for example, be asymmetrical in the vertical direction (that is, the Y direction) and be symmetrical in the lateral direction (that is, the X direction), and moreover each of the surfaces 23*a* and 23*b* can be configured to be a free form surface or aspheric surface, for example. In addition, a main body portion of the see-through mirror 23 may be made of, for example, resin, but can also be made of glass.

Also, although not depicted in detail in the drawings, the projection lens 21 and the prism 22, along with the display element 11, are accommodated in a case (not illustrated) made of a light shielding material, and the see-through mirror 23 is supported via, for example, a support plate provided to the case. In this way, for example, the exterior member 103 is configured supported by the support apparatus 101C illustrated in FIG. 1.

Hereafter, a simple description will be given of guiding the imaging light ML that exits the display element 11 using the optical unit 12 that is used as the light-guiding device.

First, in the projection lens 21, the imaging light ML that exits the display element 11 is incident on and refracted by the incident surface 21a, and exits the emitting surface 21b while being refracted by the emitting surface 21b. As a result, the projection lens 21 condenses the imaging light ML in a nearly parallel beam and the light exits toward the prism 22. Next, in the prism 22, the imaging light ML that exits the projection lens 21 is incident on and refracted by the incident surface 22a, is reflected (total reflection) by the inner reflection surface 22b, and exits the emitting surface 22c while being refracted by the emitting surface 22c. Lastly, the imaging light ML that exits the prism 22 is reflected toward the pupil position PP by the see-through mirror 23. More specifically, as previously discussed, the imaging light ML is first incident on and refracted by the first surface 23a, and is reflected by the second surface 23b, after which the imaging light ML is once again refracted by the first surface 23a and exits toward the pupil position PP. The pupil position PP is a position where the imaging light ML from various points on the display surface 11a is incident in a prescribed dispersed or parallel state so as to be superimposed in an angle direction that corresponds to the position of each point on the display surface 11a. The optical unit 12 in the drawings has a field of view (FOV) of 44°. The display area of the virtual image using the optical unit 12 is a rectangle and the above-noted 44° is a diagonal direction.

Note that in the above example, the optical unit 12 is an off-axis optical system. That is, the projection lens 21, the prism 22, and the see-through mirror 23 constituting the optical unit 12 are disposed so as to form an off-axis optical system. Note that the optical unit 12 being an off-axis optical system indicates that in the optical elements 21, 22, and 23 constituting the optical unit 12, an optical path is bent, overall, before or after a light beam strikes at least one of a reflection surface and a refraction surface. In addition, an optical axis of the optical unit 12 discussed above, which is an off-axis optical system, is arranged in a "Z" shape when viewed in lateral cross-section. That is, as illustrated in the drawings, an optical path from the projection lens 21 to the inner reflection surface 22b of the prism 22, an optical path from the inner reflection surface 22b to the see-through mirror 23, and an optical path from the see-through mirror 23 to the pupil position PP are arranged to fold back at two stages in a "Z" shape.

Note that in the optical path of the imaging light ML exemplified in the drawings, an intermediate image IM is formed between the prism 22 and the see-through mirror 23.

Figure 3:
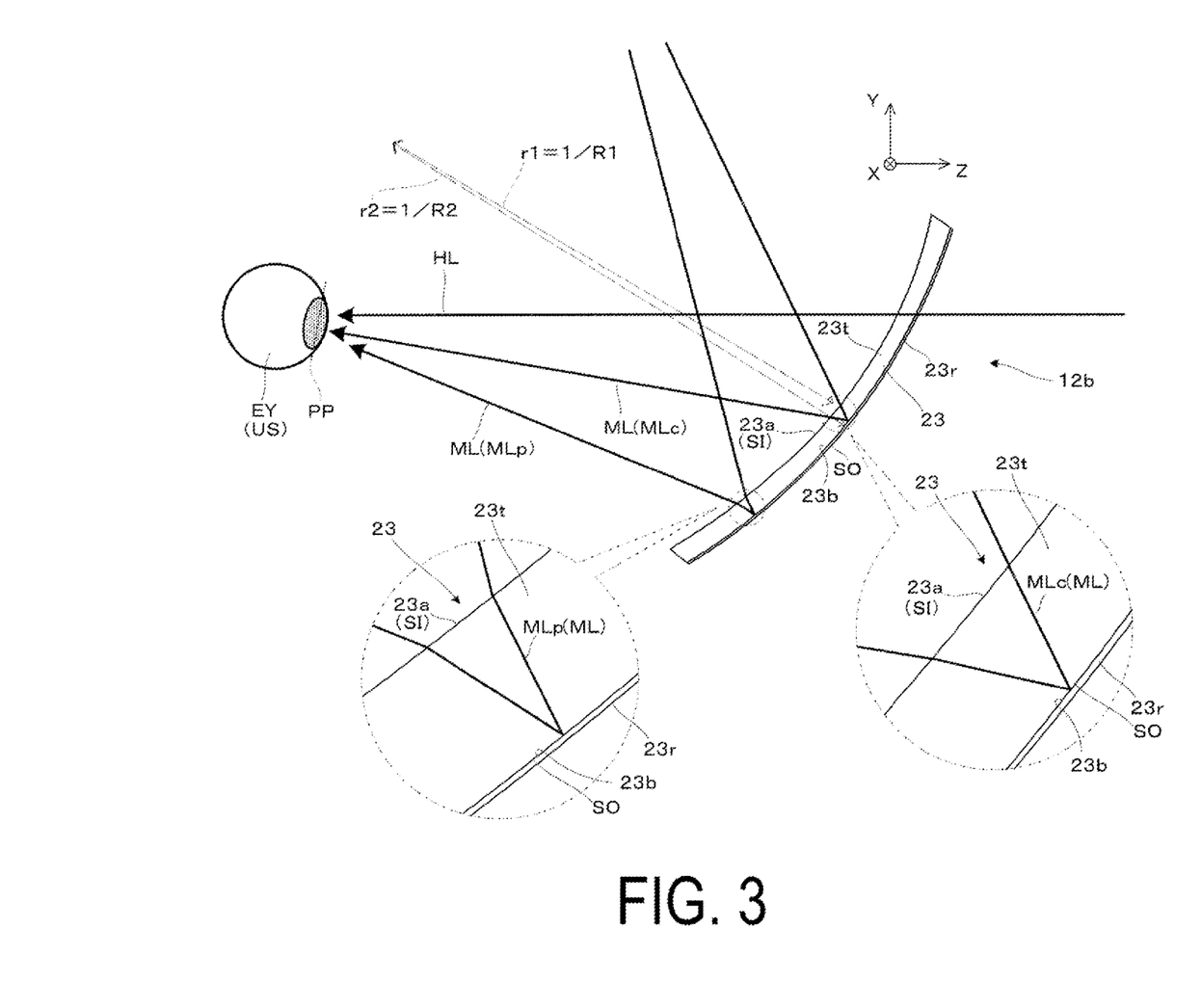
FIG. 3 is a lateral cross-sectional view schematically illustrating a structure of a see-through mirror used as a mirror member.

Hereafter, the see-through mirror 23 being used as the mirror member 12b will be further described with reference to FIG. 3. FIG. 3 is a lateral cross-sectional view schematically illustrating a structure of the see-through mirror 23, and in the example illustrated in the drawings, the see-through mirror 23 is a member with a layered structure configured by an optically transparent member 23t and a mirror film 23r.

The optically transparent member 23t is a thin, plate-shaped member approximately several millimeters thick or less, for example, and is made of a material having sufficient optical transparency, such as polycarbonate (PC), and having a high refractive index and dispersion (Abbe number).

The optically transparent member 23t includes an inner surface SI forming a surface that will become the first surface 23a and an outer surface SO forming a surface that will become the second surface 23b. In other words, the inner surface SI is formed with an outer shape having a prescribed curvature in order to create the first surface 23a and the outer surface SO is formed with an outer shape having a different curvature from the inner surface SI in order to create the second surface 23b.

Of the surfaces of the optically transparent member 23t, the mirror film 23r is provided on the outer surface SO and is formed of, for example, a dielectric multilayer film configured by a plurality of dielectric layers having adjusted film thickness. The mirror film 23r may also be a single layer film or a multilayer film of metal such as Al or Ag having adjusted film thickness. Furthermore, the mirror film 23r can be formed by lamination, but can also be formed by bonding a sheet-shaped reflective film. When the mirror film 23r is provided on the outer surface SO, the second surface 23b having the prescribed curvature creates an interface between the optically transparent member 23t and the mirror film 23r.

Here, various modes are conceivable for defining the curvatures of the inner surface SI and the outer surface SO of the optically transparent member 23t, and consequently the curvatures of the first surface 23a and the second surface 23b of the see-through mirror 23. For example, it is conceivable that a position (point) where a center light of the imaging light ML is incident on the surfaces may be used as a reference and the curvature at that position (reference point) may be found (including cases using approximation) to establish (define) curvatures R1 and R2 that will serve as references.

Note that the exemplary see-through mirror 23 discussed above can be understood to be provided with the mirror film 23r, as a vapor deposition film, on the optically transparent member 23t having a single-layer structure, and can also be understood to be a multilayer structure (structure having two or more layers) configured by the optically transparent member 23t and the mirror film 23r having a configuration with one layer, or two or more layers.

In addition, in the above case, as illustrated by partial enlargement in the drawings, when comparing a first component MLc passing through a center part of the see-through mirror 23 and a second component MLp passing through a peripheral part during transmission (refraction) of the imaging light ML in the first surface 23a, due to the difference in incident angle on the first surface 23a and the difference in the curvatures of the first surface 23a and the second surface 23b, differences can be seen in a degree of bending in the refraction or reflection of the light beam from point to point. That is, due to the see-through mirror 23 having a non-uniform shape (having non-uniform thickness between the first surface 23a and the second surface 23b), the prescribed aberration correction to correct eccentric aberration is possible. In the above-noted example, the optical unit 12 is an off-axis optical system and the see-through mirror 23 being used as the mirror member 12b corrects the eccentric aberration in the off-axis optical system.

With respect to the virtual image that is visible due to the imaging light ML discussed above, a component that will be recognized as an image (virtual image) of a center portion, such as with the first component MLc, is oriented in the Z direction at approximately −10°, where a downward orientation is treated as negative. In other words, the see-through mirror 23 covering the front (+Z side) of the pupil position PP is disposed such that an exit optical axis extends at approximately a 10° downward incline relative to the +Z direction. This is because human vision is stable in a slightly downcast gaze angled about 10° downward from the horizontal. Note that the horizontal direction in the virtual image display device 100 assumes a case where the user US wearing the virtual image display device 100 has a relaxed, erect posture and holds a steady forward gaze at the horizontal direction or the horizon. The disposition of the eyes and the shape and posture of the head including the disposition of the ears, for example, of each individual user US who wears the virtual image display device 100 are varied, but by assuming an average head shape and head posture for the user US, an average direction can be established as the horizontal direction in the virtual image display device 100 on which the user US focuses.

On the other hand, when external light HL is incident on the see-through mirror 23, the light first transits the second surface 23b from the mirror film 23r side (+Z side), after which the light passes through the optically transparent member 23t and exits the first surface 23a. In this way, the mirror film 23r has optical transparency, and thus the virtual image can overlap with an external image.

In addition, in the foregoing, the optically transparent member 23t with the concave surface is made of a material with a high refractive index and dispersion (Abbe number) such as polycarbonate, as previously discussed. In other words, the mirror member 12b is a concave mirror configured by a material having a refractive index equal to or greater than a prescribed value and an Abbe number equal to or greater than a prescribed value. Accordingly, as relates to aberration correction with the see-through mirror 23, a color aberration (achromatism) can also be corrected. Note that correction of various aberrations including color aberration is not limited to cases of the see-through mirror 23 alone; aberrations can also be corrected with the cooperation of the other optical elements 21 and 22. For example, by increasing the Abbe number of the prism 22 or the projection lens 21 in addition to the optically transparent member 23t, overall residual chromatic dispersion can be reduced.

On the other hand, from the viewpoint of being see-through, that is, from the viewpoint of a configuration that makes the external light HL visible as well, keeping changes in magnification of an external image small and maintaining see-through performance are also sought. Given this, in the present exemplary embodiment, the curvature R1 (inverse of a curvature radius r1 of the first surface 23a) of the first surface 23a (transmission surface) differs from the curvature R2 (inverse of the curvature radius r2 of the second surface 23b) of the second surface 23b (reflection surface) within a range of ±20%. Specifically, given R1≠R2, the curvatures R1 and R2 are established so as to satisfy Formula (1):

$$0.8 \times R2 < R1 < 1.2 \times R2 \tag{1}$$

That is, the shapes of the first surface 23a and the second surface 23b are determined so as to satisfy Formula (1).

Note that in the illustrated example, R1>R2 (r1<r2) and the thin plate-shaped see-through mirror 23 (optically transparent member 23t) increases in thickness advancing from the center toward the periphery (diverges from the reference point of the curvature setting). In other words, in a region having the first surface 23a and the second surface 23b as optical surfaces, the see-through mirror 23 (optically transparent member 23t) grows thicker from the center of the region toward the periphery. However, changes in the curvature (changes in thickness) are not limited to this, and a case is also conceivable where the see-through mirror 23 (optically transparent member 23t) grows thinner when R1<R2, that is as the see-through mirror 23 diverges from the reference point of the curvature setting. In such a case, the thickness at the reference point of the curvature setting is configured to be approximately 2 mm or less, for example, and thus the see-through mirror 23 can be given a suitable shape, size, and weight.

Figure 4:
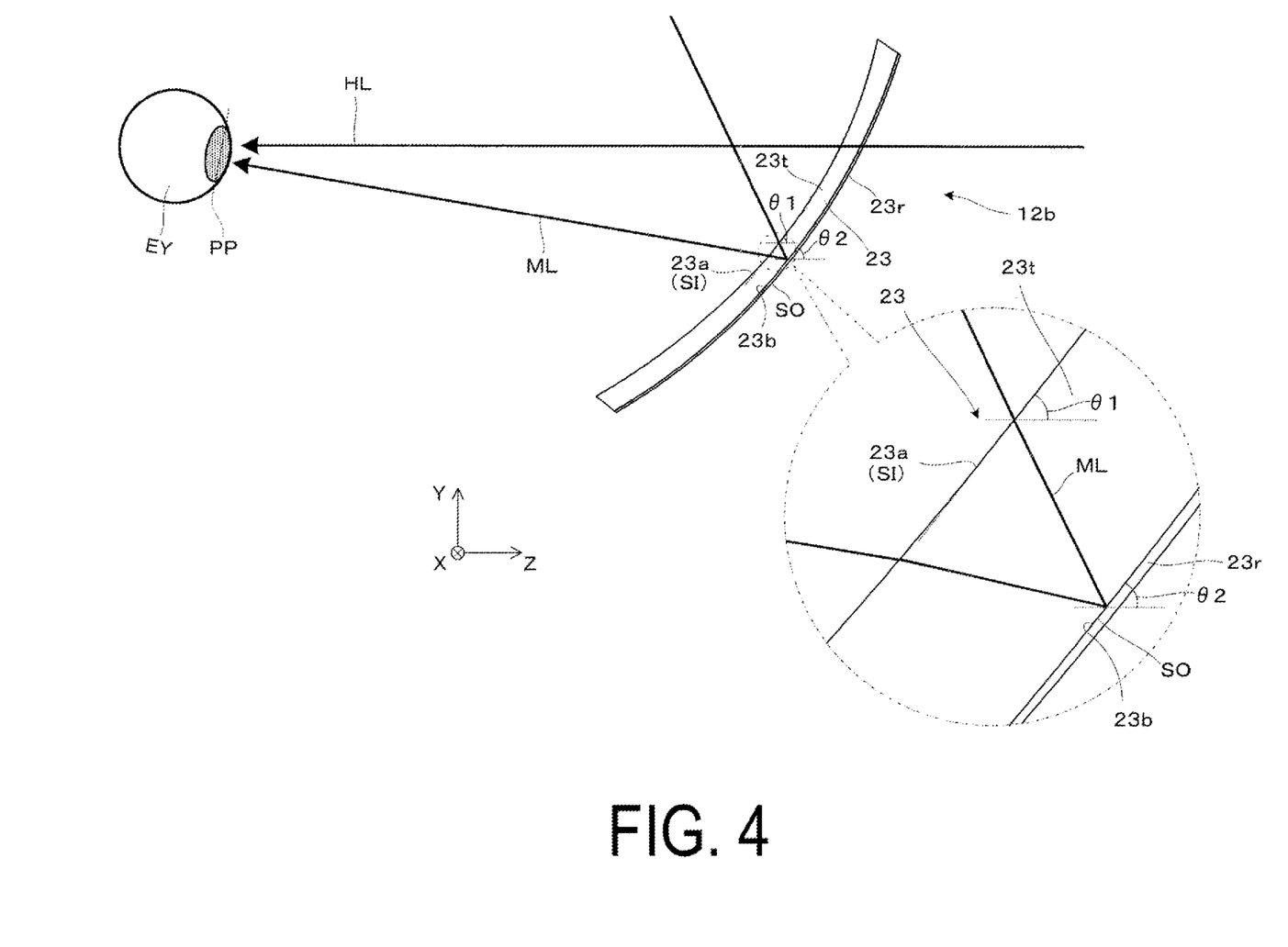
FIG. 4 is a lateral cross-sectional view illustrating an inclination angle of the see-through mirror.

In addition, as another example and as illustrated in a cross-sectional view in FIG. 4, the relative relationship between the first surface 23a and the second surface 23b may conceivably be defined by an inclination angle (an incline in a tangential direction from the reference point relative to the Z direction (front surface direction) in the cross-sectional view of FIG. 4). In the depicted example, an inclination angle θ1 of the first surface 23a (transmission surface) differs from an inclination angle θ2 of the second surface 23b (reflection surface) within a range of ±20%. Specifically, given θ1≠θ2, the inclination angles θ1 and θ2 are established so as to satisfy Formula (2):

$$0.8 \times \theta 2 < \theta 1 < 1.2 \times \theta 2 \tag{2}$$

That is, the shapes of the first surface 23a and the second surface 23b are determined so as to satisfy Formula (2). Note that a reference for establishing the inclination angles θ1 and θ2 is configured to be similar to establishing the curvatures R1 and R2, for example, but various methods may be used.

Figure 5:
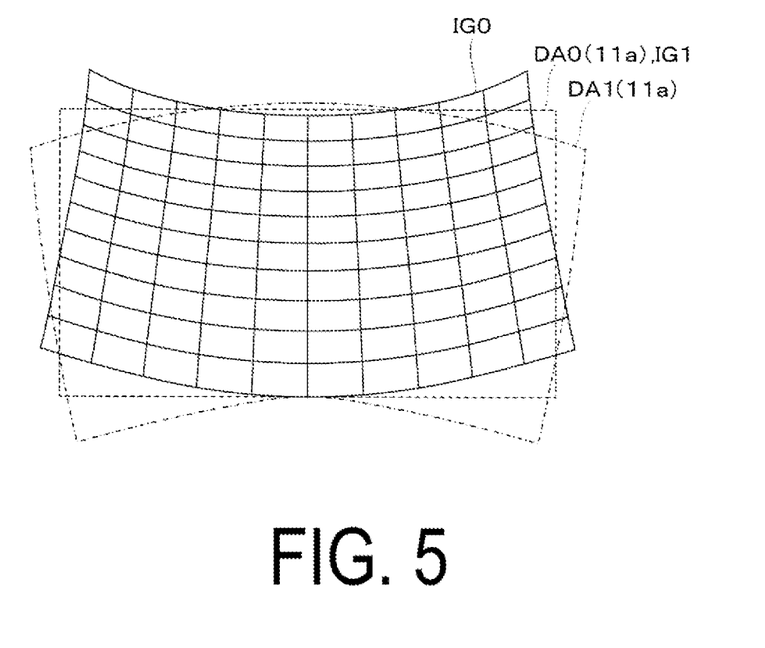
FIG. 5 is a diagram illustrating distortion of a display image formed on a display element.

Hereafter, distortion in the virtual image display device 100 will be discussed with reference to FIG. 5. As illustrated in FIG. 5, an original projected image IG0, which illustrates a state in image formation state by the optical unit 12, has a comparatively large amount of distortion. Since the optical unit 12 is an off-axis optical system, removing all distortion such as trapezoidal distortion is not easy. Accordingly, even when distortion remains in the optical unit 12, when an original display image is designated DA0, a display image formed on the display surface 11a is designated as a revised image DA1 given trapezoidal distortion that was already distorted. That is, the image displayed on the display element 11 has reverse distortion that cancels out the distortion formed by the projection lens 21, the prism 22, and the see-through mirror 23. Accordingly, a pixel array of a projection image IG1 of the virtual image observed through the optical unit 12 at the pupil position PP can be configured in a lattice pattern in which the original display image corresponds to DA0, and the outline can be configured as a rectangle. As a result, aberration can be inhibited overall, including in the display element 11, while allowing distortion aberration created by the optical unit 12. In addition, when the outer shape of the display surface 11a is rectangular, a margin is formed by creating distortion, but additional information can be displayed in such a margin. The revised image DA1 formed on the display surface 11a is not limited to an image in which distortion is created by image processing, and, for example, an array of display pixels formed on the display surface 11a may correspond to the distortion. In this case, image processing for correcting the distortion is unnecessary. Furthermore, the display surface 11a may be curved to correct an aberration.

In the foregoing, the virtual image display device 100 according to the present exemplary embodiment includes the display element 11, the light-guiding system 12a guiding the imaging light ML that exits the display element 11, and the mirror member 12b having the first surface 23a where the imaging light ML that exits the light-guiding system 12a is incident while being refracted and the second surface 23b that reflects the imaging light ML that passes through the first surface 23a and causes the imaging light ML to exit through the first surface 23a while being refracted, and in the mirror member 12b, the curvature R1 of the first surface 23a differs from the curvature R2 of the second surface 23b. Accordingly, in the virtual image display device 100, in the mirror member 12b having the first surface 23a and the second surface 23b that have different curvatures, the imaging light ML that exits the light-guiding system 12a is first incident on and refracted by the first surface 23a, after which the imaging light ML is reflected by the second surface 23b, and exits through the first surface 23a while being refracted. In this way, as compared to a case that arranges an optical system in which only reflection occurs at a location corresponding to the mirror member 12b, for example, the surfaces capable of correcting aberration can be increased without enlarging the optical system, and resolution performance can be improved.

Second Embodiment

Hereafter, a virtual image display device and the like according to a second exemplary embodiment of the present disclosure will be described. Note that the virtual image display apparatus according the second exemplary embodiment is obtained by modifying a part of the virtual image display apparatus according to the first exemplary embodiment, and description on common portions is omitted.

Figure 6A:
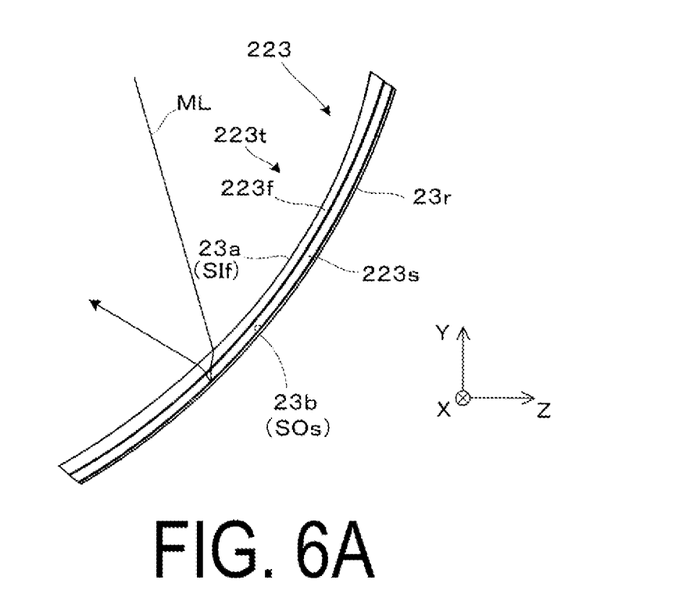
FIG. 6A is a lateral cross-sectional view schematically illustrating a see-through mirror incorporated into a virtual image display device according to a second exemplary embodiment.

An example of an optical system of the virtual image display device according to the second exemplary embodiment will be described with reference to FIG. 6A and FIG. 6B. FIG. 6A is a lateral cross-sectional view schematically illustrating a see-through mirror 223 incorporated into the virtual image display device 100 according to the present exemplary embodiment, and corresponds to FIG. 3.

As illustrated in the drawings, in the present exemplary embodiment, in the see-through mirror 223, an optically transparent member 223t is configured with a multilayer structure in which materials having different refractive indexes are bonded together. The present exemplary embodiment differs from the mode exemplified in the first exemplary embodiment in this respect.

As illustrated in FIG. 6A, the see-through mirror 223 is configured by the optically transparent member 223t and a mirror film 23r. Note that the mirror film 23r is similar to the first exemplary embodiment, and thus a detailed description of the mirror film 23r will be omitted.

Figure 6B:
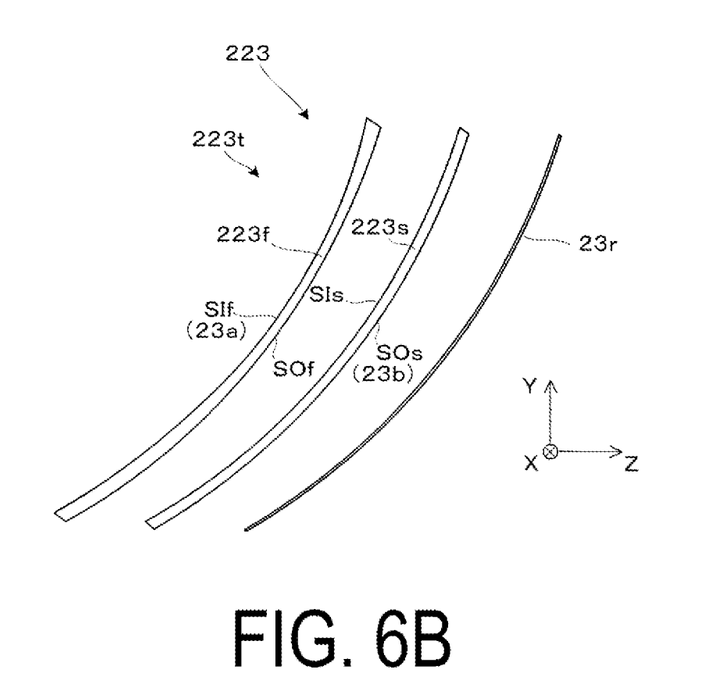
FIG. 6B is an exploded view of FIG. 6A.

As illustrated in FIG. 6A and FIG. 6B, which is an exploded view of FIG. 6A, the optically transparent member 223t is configured by a low refractive index layer 223f and a high refractive index layer 223s. Note that regarding the low refractive index layer 223f and the high refractive index layer 223s, the low refractive index layer 223f is configured by a material having a comparatively low refractive index relative to the high refractive index layer 223s. Conversely, this means that the high refractive index layer 223s is configured by a material having a comparatively higher refractive index than the low refractive index layer 223f.

The optically transparent member 223t is configured to have the low refractive index layer 223f as the innermost (−Z) layer, the high refractive index layer 223s on the outer side of the low refractive index layer 223f, and to further include the mirror film 23r on the outer side of the high refractive index layer 223s.

As illustrated in FIG. 6B, the low refractive index layer 223f is a concave member having a thin plate shape and includes an inner surface SIf as an inside (−Z) surface that will form the first surface 23a of the see-through mirror 223, and an outer surface SOf as an outside (+Z) surface. Note that the curvature of the inner surface SIf and the curvature of the outer surface SOf are different.

The high refractive index layer 223s is a concave member having a thin plate shape and includes an inner surface SIs as an inside (−Z) surface and an outer surface SOs as an outside (+Z) surface that will form the second surface 23b of the see-through mirror 223. Note that the curvature of the inner surface SIs and the curvature of the outer surface SOs are different.

On the other hand, from the viewpoint of bonding the components together, the entire curved surface shape including the curvature is the same for the outer surface SOf of the low refractive index layer 223f and the inner surface SIs of the high refractive index layer 223s.

Note that the second surface 23b having the prescribed curvature is created by providing the mirror film 23r on the outer surface SOs of the high refractive index layer 223s.

As noted above, in the present exemplary embodiment, a configuration in which materials having different refractive indexes are bonded together is applied to the see-through mirror 223 being used as the mirror member 12b that is a mirror positioned in front of the eye. In other words, the see-through mirror 223 used as the mirror member 12b has a multilayer structure obtained by combining the low refractive index layer 223f and the high refractive index layer 223s. Accordingly, the virtual image display device 100 can increase the aberration correction surfaces without enlarging the optical system.

Note that in the above example, the optically transparent member 223t is configured with a two-layer structure having one layer of the low refractive index layer 223f and one layer of the high refractive index layer 223s, but a configuration having three or more layers is also conceivable. A configuration that includes an air layer in any of the various layers is also conceivable.

Third Embodiment

Hereafter, a virtual image display device and the like according to a third exemplary embodiment of the present disclosure will be described. Note that the virtual image display device according to the third exemplary embodiment is obtained by modifying a part of the virtual image display device and the like according to the first exemplary embodiment, and descriptions of portions shared in common are omitted.

Figure 7:
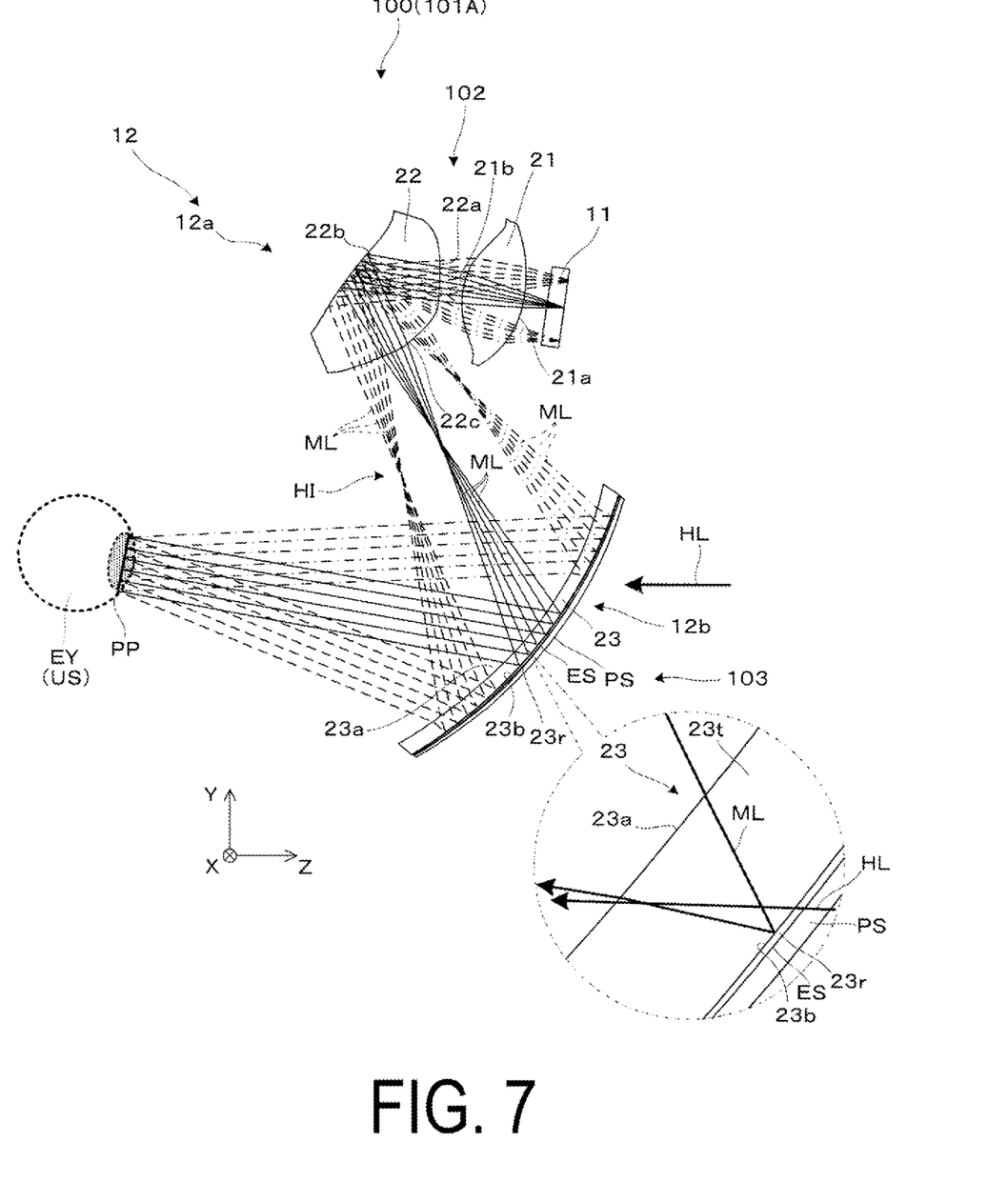
FIG. 7 is a lateral cross-sectional view of an optical system of a virtual image display device according to a third exemplary embodiment.

An example of an optical system of the virtual image display device according to the present exemplary embodiment will be described with reference to FIG. 7. FIG. 7 is a lateral cross-sectional view illustrating the optical system configuring the virtual image display device 100 according to the present exemplary embodiment, and corresponds to FIG. 2.

As illustrated in the drawing, in the present exemplary embodiment, the see-through mirror 23 is provided, on an external side (+Z side), with a compensation protection sheet member PS for protecting the see-through mirror 23. The present exemplary embodiment differs from the mode exemplified in the first exemplary embodiment, for example, in this respect.

As illustrated in the drawing, the compensation protection sheet member PS covers an external light incident surface ES that is a surface on the outer side of the mirror film 23r, and protects the see-through mirror 23 on the outer side (+Z side) of the see-through mirror 23, that is, on a side where an external light HL is incident.

Various materials and shapes can be adopted for the compensation protection sheet member PS. For example, as a shape, the compensation protection sheet member PS may be configured to cancel out changes in magnification of an external image that are caused by the optically transparent member 23t. In such a case, the compensation protection sheet member PS has a function of compensating for transmission of the external light HL.

As noted above, in the present exemplary embodiment, the compensation protection sheet member PS is provided covering the external light incidence surface ES of the see-through mirror 23 and protecting the see-through mirror 23 while compensating for transmission of the external light HL. Accordingly, for the imaging light ML, a mode ensuring favorable see-through performance for the external light HL while correcting aberration can be achieved.

Modified Examples Etc.

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display device 100 according to the exemplary embodiments described above, the light-guiding system 12a and the mirror member 12b are described as forming an off-axis optical system or a non-coaxial optical system, but the virtual image display device 100 is not limited to this and may conceivably be applied to an optical system that is symmetrical about an axis of rotation. For example, the mirror member 12b having the first surface 23a and the second surface 23b may conceivably be applied instead of a concave mirror in a typical birdbath optical system. In such a case, the mirror member 12b may conceivably be configured to not be transmissive.

In addition, in the foregoing description, the size in the Z direction or a surface direction of the optical unit 12, for example, may conceivably be arranged such that a distance from the pupil position PP to the see-through mirror 23 is approximately 30 mm to 40 mm.

In addition, in the virtual image display device 100 in the above-described exemplary embodiments, a self-luminous display device such as an organic EL element or the like or an LCD and other optical modulation unit are used as the display element 11. Instead, a configuration in which a laser scanner obtained by combining a laser light source and a scanner, such as a polygon mirror, can also be used as the display element 11. That is, the present disclosure can be applied to a laser retinal projection-type head-mounted display.

A light control device that modulates light by limiting transmitted light in the see-through mirror 23 may be attached to the external side of the see-through mirror 23. The light control device adjusts a transmittance, for example, electrically. Mirror liquid crystals, electronic shades, and the like may be used as the light control device. The light control device may adjust a transmittance according to external light brightness. When the light control device blocks the external light HL, it is possible to observe only a virtual image that is not affected by an external image. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

In the foregoing, light is guided in the vertical, or Y, direction, but light can also be guided in the lateral, or X, direction.

A specific mode of a virtual image display device includes a display element, a light-guiding system configured to guide imaging light that exits the display element, and a mirror member having a first surface where the imaging light that exits the light-guiding system is incident while being refracted and a second surface that reflects the imaging light that passes through the first surface and causes the imaging light to exit the mirror member through the first surface where the imaging light is refracted, and in the mirror member, the curvature of the first surface differs from the curvature of the second surface.

In the virtual image display device, in the mirror member having the first surface and the second surface that have different curvatures, the imaging light that exits the light-guiding system is first incident on and refracted by the first surface, after which the imaging light is reflected by the second surface, and exits through the first surface while being refracted. In this way, as compared to a case that arranges an optical system in which only reflection occurs at a location corresponding to the mirror member, for example, the surfaces capable of correcting aberration can be increased without enlarging the optical system, and resolution performance can be improved.

In a specific aspect, the mirror member has non-uniform thickness between the first surface and the second surface. In such a case, by having the non-uniform thickness, a prescribed aberration correction can be accomplished using a difference between the curvature of the first surface and the curvature of the second surface.

In another aspect, the mirror member becomes thicker from the center of the optical surface toward the periphery.

In still another aspect, the light-guiding system includes a projection lens converging the imaging light that exits the display element and a prism where the imaging light that exits the projection lens is incident on and refracted by an incident surface, the imaging light is totally reflected by an inner reflection surface, and the imaging light exits through an emitting surface while being refracted, and the mirror member is a see-through mirror reflecting the imaging light that exits the prism toward a pupil position and transmitting external light. In such a case, in the see-through mirror used as the mirror member, the surfaces capable of correcting aberration can be increased without enlarging the optical system, further optical performance improvements can be achieved with the projection lens and the prism, and the device can be miniaturized.

In still another aspect, a Z-shaped optical path is formed by two-stage folding including folding at the inner reflection surface of the prism and folding at the second surface of the see-through mirror. In such a case, by bending the optical path in the "Z" shape, device miniaturization can be achieved.

In still another aspect, the projection lens includes a free form surface as an optical surface. In such a case, the number of constituent elements of the projection lens can be reduced while achieving a higher degree of accuracy.

In still another aspect, the incident surface, inner reflection surface, and emitting surface of the prism are free form surfaces. In such a case, miniaturization of the overall optical system that includes the prism can be achieved.

In still another aspect, a compensation protection sheet member is provided covering an external light incidence surface of the see-through mirror and protecting the see-through mirror while compensating for transmission of the external light. In such a case, for the imaging light, ensuring favorable see-through performance for the external light while correcting aberration can be achieved.

In still another aspect, the mirror member has a multilayer structure obtained by combining a low refractive index layer and a high refractive index layer. In such a case, using the multilayer structure can increase the aberration correction surfaces without enlarging the optical system.

In still another aspect, the light-guiding system and the mirror member form an off-axis optical system. In such a case, miniaturization of the optical system and consequently miniaturization of the device overall can be achieved while preserving resolution.

In still another aspect, the mirror member corrects eccentric aberration in the off-axis optical system.

In still another aspect, the mirror member is a concave mirror configured by a material having a refractive index equal to or greater than a prescribed value and an Abbe number equal to or greater than a prescribed value. In such a case, in addition to correcting eccentric aberration, color aberration can also be corrected.

In still another aspect, the curvature of the first surface differs from the curvature of the second surface within a range of ±20%. In such a case, by restricting the difference in curvature, extreme degradation of see-through performance, for example, can be avoided while performing correction for correcting eccentric aberration or the like.

In still another aspect, an inclination angle of the first surface differs from the inclination angle of the second surface within a range of ±20%. In such a case, by restricting the difference in inclination angle, extreme degradation of see-through performance, for example, can be avoided while performing correction for correcting eccentric aberration or the like.

In still another aspect, the image displayed on the display element has distortion that cancels out the distortion created by the light-guiding system and the mirror member. In such a case, aberration can be inhibited overall, including in the display element, while allowing distortion aberration created by the mirror member or the like.

A specific mode of an optical unit includes a light-guiding system configured to guide imaging light that exits a display element and a mirror member having a first surface where the imaging light that exits the light-guiding system is incident while being refracted and a second surface that reflects the imaging light that passes through the first surface and causes the imaging light to exit the mirror member through the first surface where the imaging light is refracted, and in the mirror member, the curvature of the first surface differs from the curvature of the second surface.

In the optical unit described above, in the mirror member having the first surface and the second surface that have different curvatures, the imaging light that exits the light-guiding system is first incident on and refracted by the first surface, after which the imaging light is reflected by the second surface, and exits through the first surface while being refracted. In this way, as compared to a case that arranges an optical system in which only reflection occurs at a location corresponding to the mirror member, for example, the surfaces capable of correcting aberration can be increased without enlarging the optical system, and resolution performance can be improved.

What is claimed is:

1. A virtual image display device comprising:
   a display element emitting an imaging light;
   a light-guiding system guiding the imaging light from the display element; and
   a mirror member including:
      a first surface that refracts the imaging light that is incident from the light-guiding system, and
      a second surface that reflects the imaging light passed through the first surface,
   wherein
      the image light that exits the light-guiding system is first incident on and refracted by the first surface toward the second surface, the imaging light that passes through and refracted by the first surface is then reflected by the second surface, and the image light that is reflected by the second surface is directed toward the first surface to exit out of the mirror member and is refracted by the first surface toward a pupil position,
      a curvature of the first surface of the mirror member is different from a curvature of the second surface of the mirror member,
      a center region of the mirror member is thinner than a periphery region of the mirror member,
      in the periphery region of the mirror member, a thickness of a first periphery region which corresponds to one side in a lateral direction is same as a thickness of a second periphery region which corresponds to another side in the lateral direction, the lateral direction being a direction in which both eyes of a user using the virtual image display device are aligned, and
      in the periphery region of the mirror member, a thickness of a third periphery region which corresponds to one side in a vertical direction interesting the lateral direction is different from a thickness of a fourth periphery region which corresponds to another side in the vertical direction.

2. The virtual image display device according to claim 1, wherein
   the light-guiding system includes:
      a projection lens converging the imaging light that exits the display element, and
      a prism having an incident surface that refracts the imaging light incident thereon from the projection lens, an inner reflection surface that reflects the imaging light passed through the incident surface, and an emitting surface that refracts the imaging light reflected by the inner reflection surface out of the prism, and
   the mirror member reflects the imaging light toward the pupil position and transmits an external light.

3. The virtual image display device according to claim 2, wherein a Z-shaped optical path is formed by a two-stage folding obtained by folding the optical path at the inner reflection surface of the prism and folding the optical path at the second surface of the mirror member.

4. The virtual image display device according to claim 2, wherein the projection lens includes a free form surface.

5. The virtual image display device according to claim 2, wherein each of the incident surface, the inner reflection surface, and the emitting surface is a free form surface.

6. The virtual image display device according to claim 2, wherein the mirror member includes a compensation protection sheet member on which the external light is incident.

7. The virtual image display device according to claim 2, wherein the mirror member has a low refractive index layer and a high refractive index layer.

8. The virtual image display device according to claim 1, wherein the light-guiding system and the mirror member form an off-axis optical system.

9. The virtual image display device according to claim 8, wherein the mirror member corrects an eccentric aberration in the off-axis optical system.

10. The virtual image display device according to claim 1, wherein the mirror member is a concave mirror configured by a material having a refractive index equal to or greater than a prescribed value and an Abbe number equal to or greater than a prescribed value.

11. The virtual image display device according to claim 1, wherein the curvature of the first surface of the mirror member is different from the curvature of the second surface of the mirror member within a range of ±20%.

12. The virtual image display device according to claim 1, wherein an inclination angle of the first surface of the mirror member is different from an inclination angle of the second surface of the mirror member within a range of ±20%.

13. The virtual image display device according to claim 1, wherein an image displayed on the display element has distortion that cancels out distortion created by the light-guiding system and the mirror member.

14. An optical unit comprising:
a light-guiding system guiding an imaging light; and
a mirror member including:
 a first surface that refracts the imaging light that is incident from the light-guiding system, and
 a second surface that reflects the imaging light passed through the first surface, wherein
the image light that exits the light-guiding system is first incident on and refracted by the first surface toward the second surface, the imaging light that passes through and refracted by the first surface is then reflected by the second surface, and the image light that is reflected by the second surface is directed toward the first surface to exit out of the mirror member and is refracted by the first surface toward a pupil position,
a curvature of the first surface of the mirror member is different from a curvature of the second surface of the mirror member,
a center region of the mirror member is thinner than a periphery region of the mirror member,
in the periphery region of the mirror member, a thickness of a first periphery region which corresponds to one side in a lateral direction is same as a thickness of a second periphery region which corresponds to another side in the lateral direction, the lateral direction being a direction in which both eyes of a user using the virtual image display device are aligned, and
in the periphery region of the mirror member, a thickness of a third periphery region which corresponds to one side in a vertical direction interesting the lateral direction is different from a thickness of a fourth periphery region which corresponds to another side in the vertical direction.

* * * * *